United States Patent
Biskeborn et al.

(10) Patent No.: US 12,322,424 B2
(45) Date of Patent: Jun. 3, 2025

(54) 3-BAND MAGNETIC RECORDING TAPE AND TAPE DRIVE

(71) Applicant: Western Digital Technologies, Inc., San Jose, CA (US)

(72) Inventors: Robert G. Biskeborn, Hollister, CA (US); David J. Seagle, Morgan Hill, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/385,756

(22) Filed: Oct. 31, 2023

(65) Prior Publication Data

US 2025/0140288 A1 May 1, 2025

(51) Int. Cl.
*G11B 5/588* (2006.01)
*G11B 5/008* (2006.01)

(52) U.S. Cl.
CPC .......... *G11B 5/588* (2013.01); *G11B 5/00813* (2013.01)

(58) Field of Classification Search
None
See application file for complete search history.

(56) References Cited

U.S. PATENT DOCUMENTS

| | | | |
|---|---|---|---|
| 6,172,837 B1 * | 1/2001 | Fasen | G11B 21/086 |
| 6,934,115 B1 * | 8/2005 | Kientz | G11B 5/584 |
| 7,766,236 B2 | 8/2010 | Biskeborn et al. | |
| 8,587,905 B2 | 11/2013 | Koeppe | |
| 8,705,199 B2 | 4/2014 | Saliba et al. | |
| 9,142,224 B2 | 9/2015 | Hansen et al. | |
| 9,153,280 B2 | 10/2015 | Bui et al. | |
| 10,685,676 B1 | 6/2020 | Abe et al. | |
| 10,902,873 B1 | 1/2021 | Seagle et al. | |
| 2003/0099057 A1 * | 5/2003 | Molstad | G11B 5/59633 360/48 |
| 2003/0227702 A1 | 12/2003 | Watson et al. | |
| 2005/0254163 A1 * | 11/2005 | Nakao | G11B 5/59633 360/75 |
| 2011/0199703 A1 * | 8/2011 | Hansen | G11B 5/00826 |
| 2012/0206832 A1 | 8/2012 | Hamidi et al. | |
| 2017/0249100 A1 * | 8/2017 | Kawamura | G06F 3/0644 |
| 2019/0362749 A1 | 11/2019 | Biskeborn | |

FOREIGN PATENT DOCUMENTS

WO 2011023639 A1 3/2011

OTHER PUBLICATIONS

"StorageTek T9840D FICON Performance", Oracle, Sep. 2010, pp. 1-21, <https://www.oracle.com/technetwork/articles/systems-hardware-architecture/st-t9840d-ficon-perf-176628.pdf>.

* cited by examiner

*Primary Examiner* — Peter Vincent Agustin
(74) *Attorney, Agent, or Firm* — Patterson + Sheridan, LLP

(57) ABSTRACT

The present disclosure generally relates to a tape and a tape drive comprising a tape head and a controller. The tape drive comprises a tape comprising three data bands and four servo tracks, a servo track of the four servo tracks being disposed between adjacent data bands, one or more tape head modules, each tape head module comprising a plurality of data elements and two or more servo element pairs, and a controller configured to control each of the one or more tape head modules to write data to and read data from the tape. Each data band has a width of about one-third a total width of the tape, such as about 3800 μm to about 3900 μm. The three data bands and four servo tracks span the total width of the tape.

23 Claims, 10 Drawing Sheets

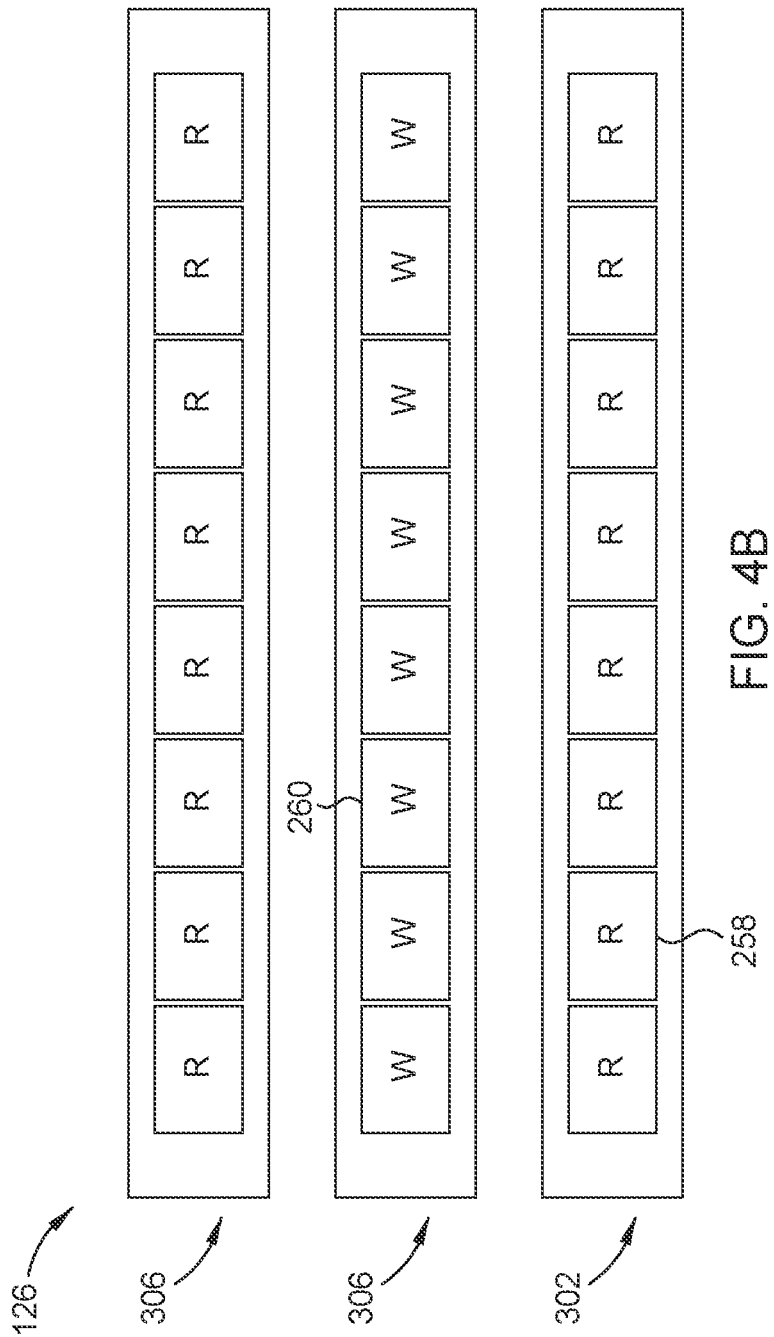

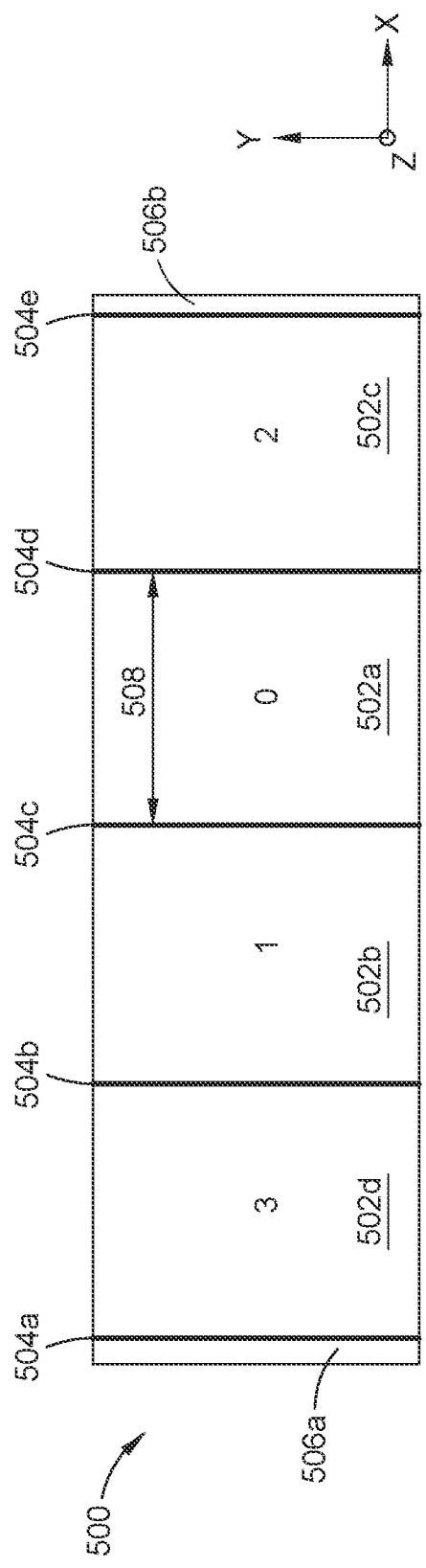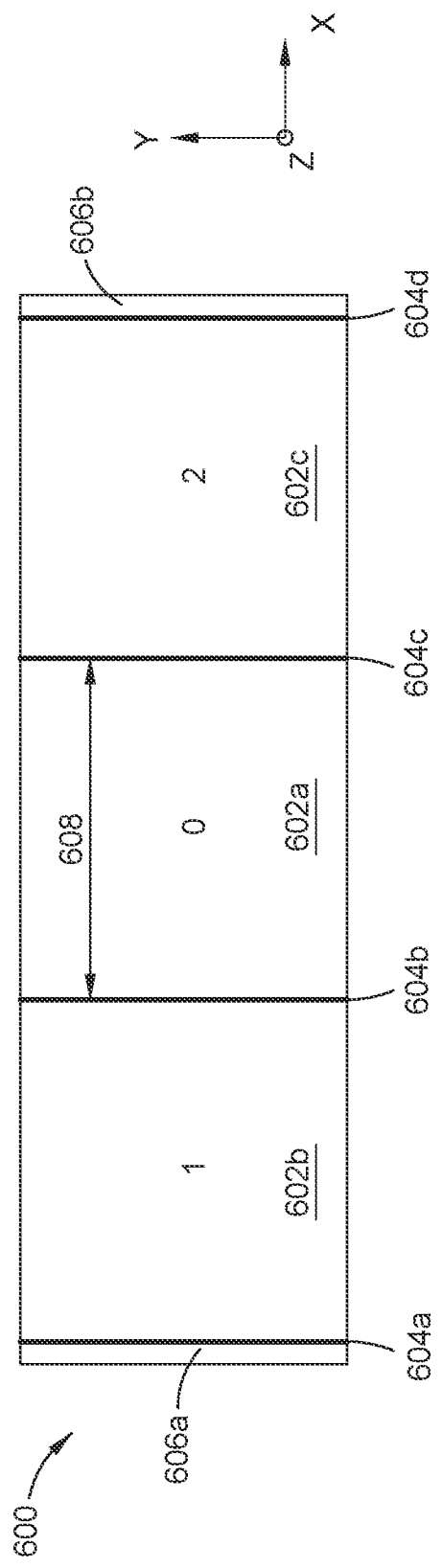
FIG. 5
FIG. 6A

3-BAND MAGNETIC RECORDING TAPE AND TAPE DRIVE

BACKGROUND OF THE DISCLOSURE

Field of the Disclosure

Embodiments of the present disclosure generally relate to a magnetic recording tape and a tape drive including the tape.

Description of the Related Art

Tape head modules of tape drive systems are used to record and read back information on tapes by magnetic processes. Magnetic transducers of the tape head modules read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

Tape drives generally come in two sizes, a full-high drive and a half-high drive. Due to the smaller size of the half-high drive, the half-high drive is generally more popular than the full-high drive, as the overall footprint of the half-high drive is smaller. The half-high drive is smaller height-wise than the full-high drive, which limits the amount of data elements and servo element pairs that can be utilized to write and read data. However, due to the difference sizes of the full-high and half-high drives, the two drives may need different types of tape heads to write to and read from a tape. For example, the tape head for the half-high drive may require the data elements to be disposed closer together, resulting in the tape head for the half-high drive having a smaller span or length for the data elements or channels of the tape than the tape head for the full-high drive. Having to form two different tape heads for the two different drives is expensive and costly.

Therefore, there is a need in the art for an improved tape head and tape that can be utilized in any tape drive.

SUMMARY OF THE DISCLOSURE

The present disclosure generally relates to a tape and a tape drive comprising a tape head and a controller. The tape drive comprises a tape comprising three data bands and four servo tracks, a servo track of the four servo tracks being disposed between adjacent data bands, one or more tape head modules, each tape head module comprising a plurality of data elements and two or more servo element pairs, and a controller configured to control each of the one or more tape head modules to write data to and read data from the tape. Each data band has a width of about one-third a total width of the tape, such as about 3800 μm to about 3900 μm. The three data bands and four servo tracks span the total width of the tape.

In one embodiment, a tape comprises three data bands and four servo tracks, a servo track of the four servo tracks being disposed between adjacent data bands of the three data bands, wherein each data band of the three data bands has a width of about one-third a total width of the tape.

In another embodiment, a tape drive comprises one or more tape head modules, each tape head module comprising a plurality of data elements and two or more servo element pairs, the plurality of data elements being write elements or read elements, a tape comprising: a first servo track being disposed adjacent to a first edge of the tape, a first data band disposed in contact with the first servo track, a second servo track disposed in contact with the first data band, a second data band disposed in contact with the second servo track, a third servo track disposed in contact with the second data band, a third data band disposed in contact with the third servo track, and a fourth servo track disposed in contact with the third data band, the fourth servo track being disposed at a second edge of the tape opposite the first edge, wherein the first, second, and third data bands each individually has a width of about one-third of a total width of the tape, and a controller configured to control each of the one or more tape head modules to write data to and read data from the tape.

In yet another embodiment, a tape drive comprises a first tape head module comprising a plurality of write elements and two or more servo element pairs, a second tape head module disposed adjacent to the first tape head module, the second tape head module comprising a plurality of read elements and two or more servo element pairs, a third tape head module disposed adjacent to the second tape head module, the third tape head module comprising a plurality of write elements and two or more servo element pairs, wherein: the tape drive is configured to receive a tape comprising not more than three data bands, each data band having a width of about one-third a total width of the tape, and the first, second, and third head modules is each about 2 μm to about 15 μm narrower than the width of each data band, and a controller configured to control each of the first and third tape head modules to write data to the tape, and to control the second tape head module to read data from the tape.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4B illustrate various configurations for the first, second and third modules of FIG. 3.

FIG. 5 illustrates a conventional tape for use in a tape drive.

FIG. 6A illustrate a tape for use in a tape drive, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape and a tape drive comprising a tape head and a controller. The tape drive comprises one or more tape head modules, each tape head module comprising a plurality of data elements and two or more servo element pairs, a tape comprising three data bands and four servo tracks, a servo track of the four servo tracks being disposed between adjacent data bands, and a controller configured to control each of the one or more tape head modules to write data to and read data from the tape. Each data band has a width of about one-third a total width of the tape, such as about 3800 µm to about 3900 µm. The three data bands and four servo tracks span the total width of the tape.

Figure 1A:
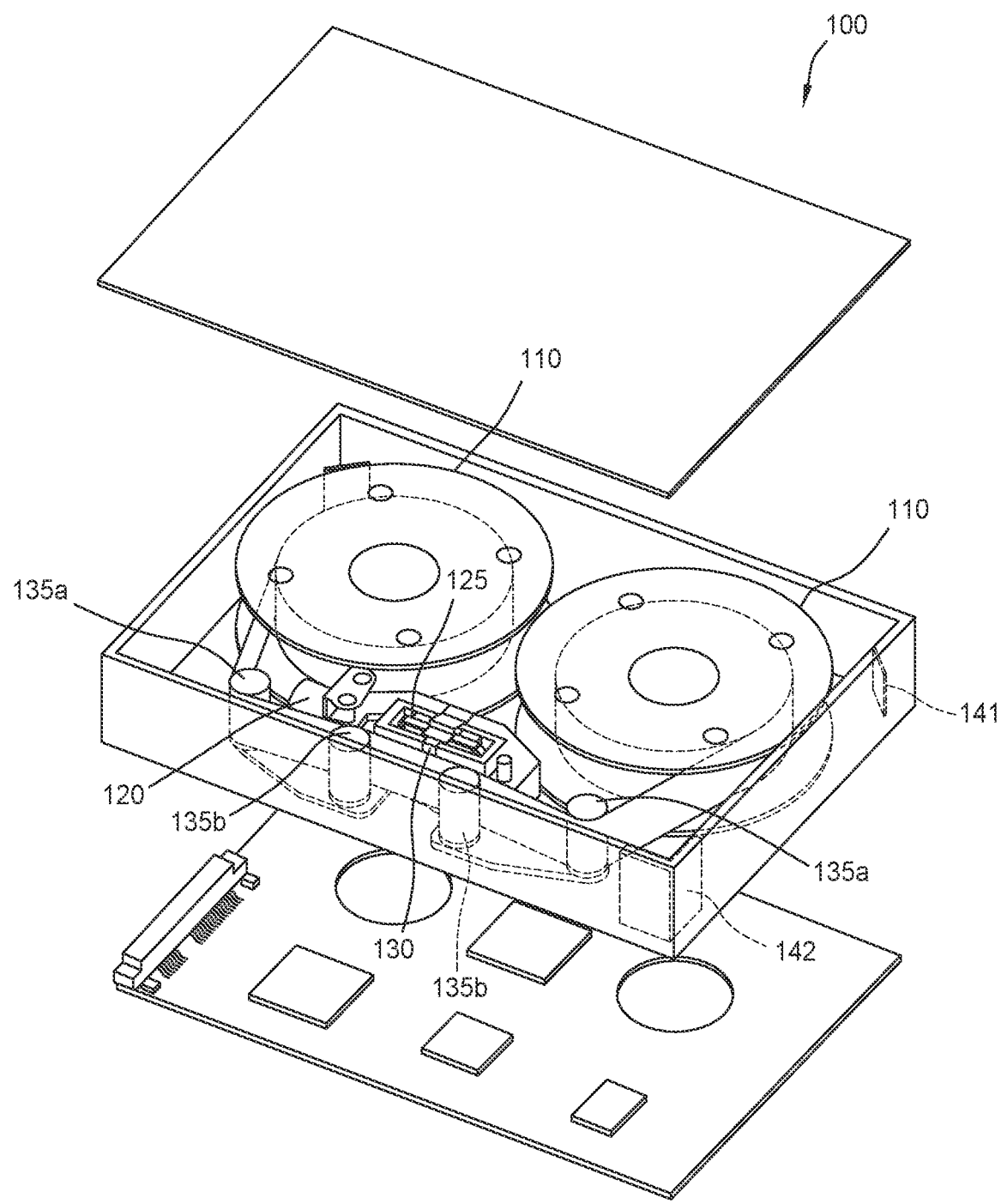
FIGS. 1A-1C illustrate a perspective exploded view, a simplified top down, and side profile view of a tape drive, in accordance with some embodiments.
Figure 1B:
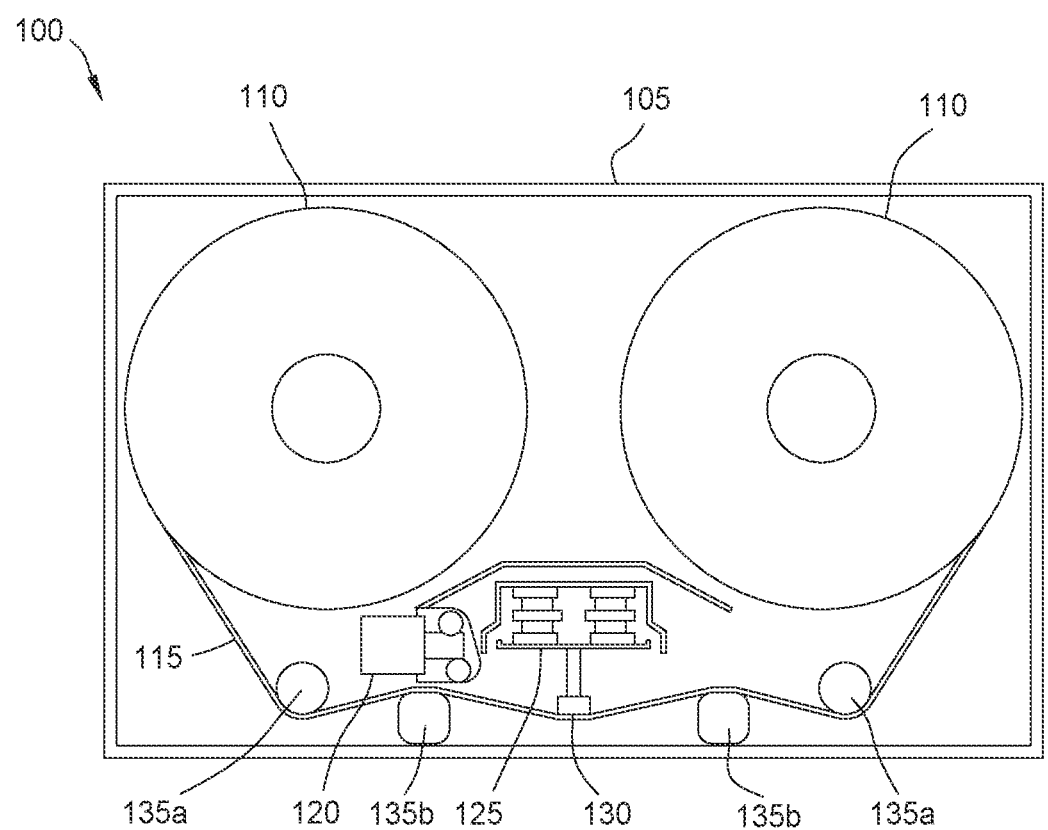
Figure 1C:
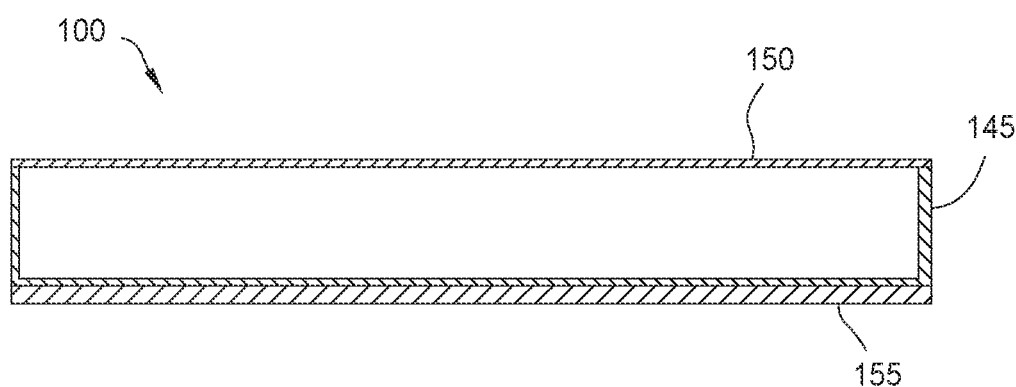

FIGS. 1A-1C illustrate a perspective exploded view, a simplified top down, and side profile view of a tape drive 100, in accordance with some embodiments. The tape drive 100 may be a captive tape drive or a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
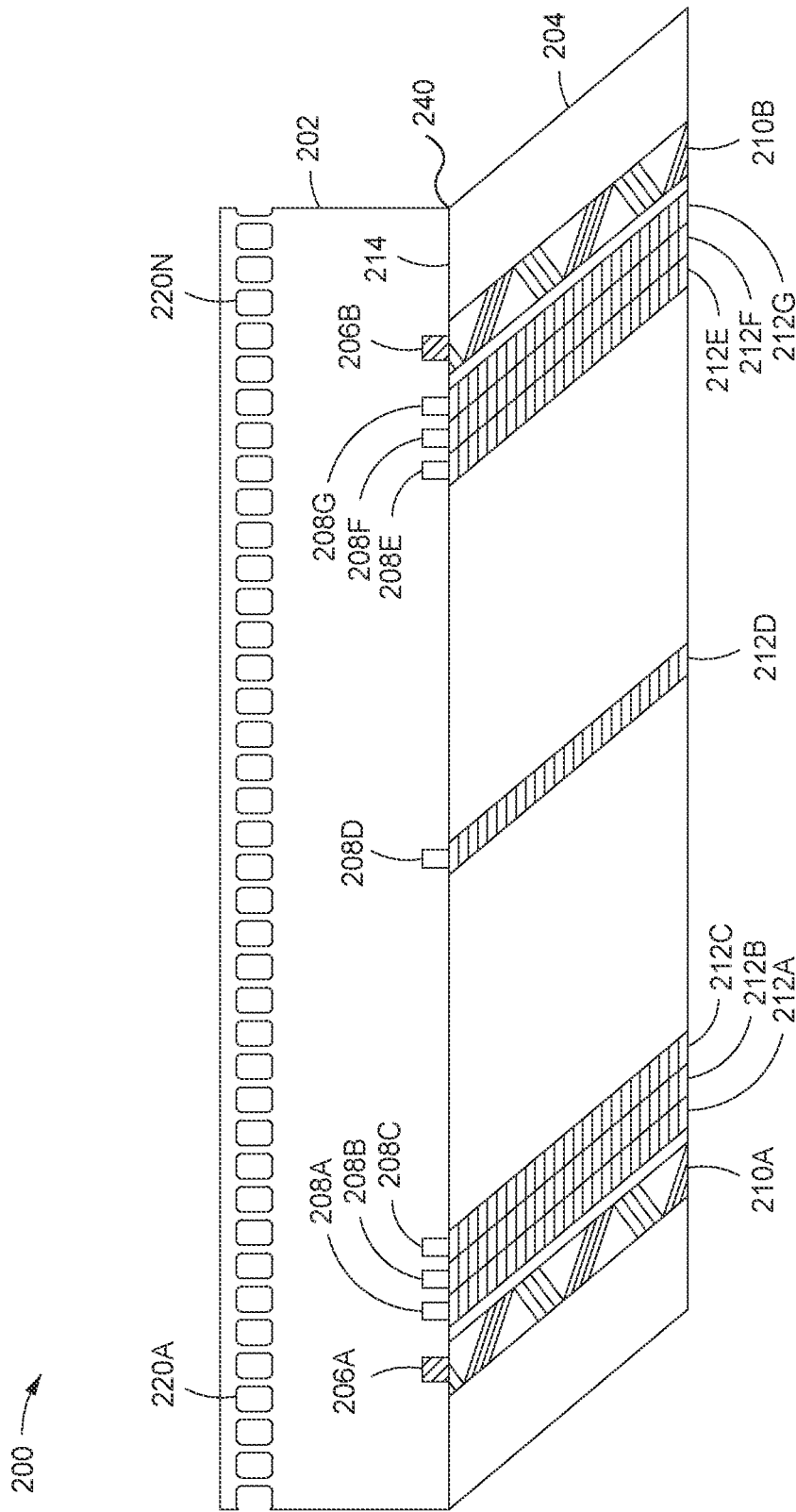
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3:
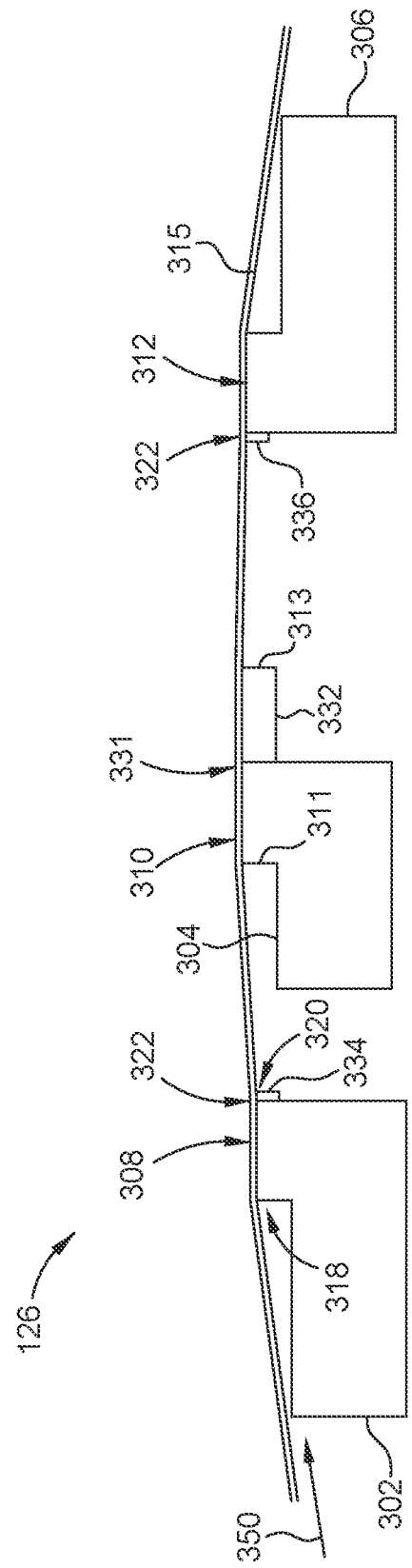
FIG. 3 illustrates a magnetic recording head according to one approach of the present disclosure that includes first, second and third modules each having a media facing surface, respectively, which may be flat, contoured, etc.
Figure 4A:
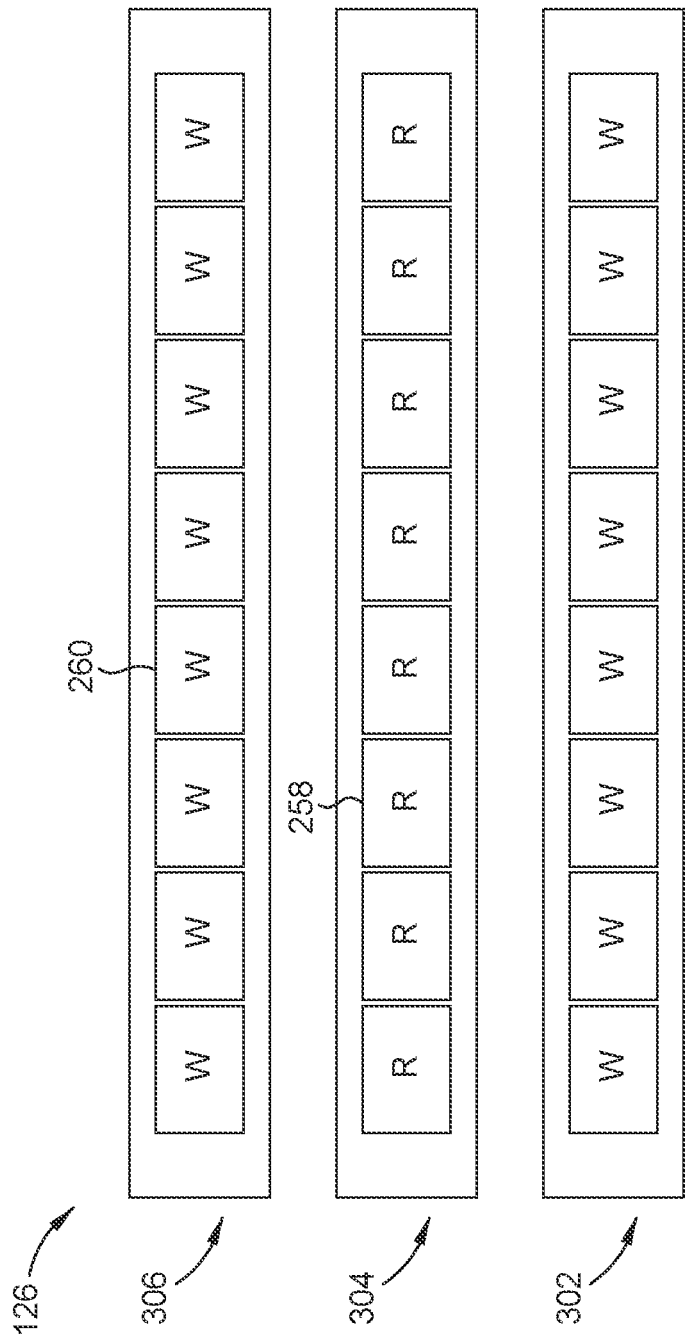

FIG. 3 illustrates a magnetic recording head 126 according to one approach of the present disclosure that includes first, second and third modules 302, 304, 306 each having a media facing surface 308, 310, 312 respectively, which may be flat, contoured, etc. FIGS. 4A-4B illustrate various configurations for the first, second and third modules 302, 304, 306 of FIG. 3.

For explanation purposes, the first module 302, or the leading module 302, is the first module encountered by the tape 315 in a three module design for tape 315 moving in the indicated direction by arrow 350. The third module 306, or the trailing module 306, follows the middle module 304 and is the last module seen by the tape 315 in a three module design. The leading and trailing modules 302, 306 are referred to collectively as outer modules. Also note that the outer modules 302, 306 will alternate as leading modules, depending on the direction of travel of the tape 315.

In a write-read-write (W-R-W) head, outer modules for writing flank one or more inner modules for reading. FIG.

4A illustrates a W-R-W configuration, the outer modules 302, 306 each include one or more arrays of writers (W) 260. The inner module 304 of FIG. 4A includes one or more arrays of readers (R) 258 in a similar configuration. Variations of a multi-module head include a R-W-R head, like shown in FIG. 4B, a R-R-W head, a W-W-R head, etc. In yet other variations, one or more of the modules may have read/write pairs of transducers. While each module comprises 8 readers 258 or 8 writers 260, each module may include a greater number of readers 258 and/or writers 260.

Writing and reading functions are performed by different modules at any given time. In one approach, the second module 304 includes a plurality of readers (such as the readers 258 of FIGS. 4A-4B) and optional servo readers 331 and no writers. The first and third modules 302, 306 include a plurality of writers 322 and no data readers, with the exception that the outer modules 302, 306 may include optional servo readers. The writers 322 may be the writers 260 of FIGS. 4A-4B. The servo readers may be used to position the head during reading and/or writing operations. The servo reader(s) on each module are typically located towards the end of the array of readers or writers.

In one approach, the media facing surfaces 308, 310, 312 of the first, second, and third modules 302, 304, 306 lie on about parallel planes, and the media facing surface 310 of the second module 304 is above the media facing surfaces 308, 312 of the first and third modules 302, 306. Such a configuration has the effect of creating the desired wrap angle of the tape 315 relative to the media facing surface 310 of the second module 304.

Where the media facing surfaces 308, 310, 312 lie along parallel or nearly parallel yet offset planes, a vacuum created by a skiving edge 318 of the leading module 302 is sufficient to keep the tape 315 adhered to the media facing surface 308 of the leading module 302. A trailing edge 320 of the leading module 302 (the end from which the tape 315 leaves the leading module 302) is the approximate reference point which defines a wrap angle over the media facing surface 310 on the leading edge 311 of the second module 304. The tape 315 stays in close proximity to the media facing surface 308 until close to the trailing edge 320 of the leading module 302. Accordingly, the writers 322 may be located near the trailing edges of the outer modules 302, 306.

Beneficially, the inner wrap angle on the leading edge 311 of the module 304 receiving the tape 315 will be larger than the inner wrap angle on the trailing edge 313, as the tape 315 rides above the trailing module 306. This difference is generally beneficial as a smaller inner wrap angle on the trialing edge 313 tends to oppose what has heretofore been a steeper exiting effective wrap angle.

The media facing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the media facing surface 312 so there is virtually no wear on the elements when tape is moving in this direction. Particularly, the tape 315 entrains air and so will not significantly ride on the media facing surface 312 of the third module 306 (some contact may occur). This is permissible, because the leading module 302 is writing while the trailing module 306 is idle.

As shown in FIG. 3, the first, second, and third modules 302, 304, 306 each have a closure 332, 334, 336, which extends the media facing surface of the associated module, thereby effectively positioning the read/write elements away from the edge of the media facing surface. In some aspects, the second module 304 has a closure, while the first and third modules 302, 306 do not have a closure. The closure 332 on the second module 304 can be a ceramic closure of a type typically found on tape head modules. The closures 334, 336 of the first and third modules 302, 306, however, may be shorter than the closure 332 of the second module 304 as measured parallel to a direction of tape travel over the respective module. This enables positioning the modules closer together.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

FIG. 5 illustrates a conventional tape 500 for use in a tape drive.

The tape 500 has a width in the x-direction of about 0.5 inches. The tape 500 comprises four data bands 502a, 502b, 502c, 502d and five servo tracks 504a, 504b, 504c, 504d, 504e (collectively referred to herein as servo tracks 504). Each data band 504a-504d has a width 508 in the x-direction between adjacent servo tracks 504 of about 5718 µm, or about one-fourth of the total width of the tape 500. Each data band 502a-502d comprises 33 data channels or data tracks, which can be written to and read from by a tape head of the tape drive. The track pitch between adjacent data channels is about 83 µm. While not shown, each servo track 504a-504e comprises a servo pattern disposed at an angle of about 12 degrees, and each servo track 504a-504e has a width in the x-direction of about 93 µm.

The first servo track 504a is disposed on a first edge of the tape 500 adjacent to the fourth data band 502d, the second servo track 504b is disposed between the second data band 502b and the fourth data band 502d, the third servo track 504c is disposed between the first data band 502a and the second data band 502b, the fourth servo track 504d is disposed between the first data band 502a and the third data band 502c, and the fifth servo track 504e is disposed at a second end of the tape 500 adjacent to the third data band 502c. A first overhang portion 506a is disposed adjacent to the first servo track 504a, and a second overhang portion 506b is disposed adjacent to the fifth servo track 504e. The first and second overhang portions 506a, 506b ensure a tape head does not extend past the edge of the tape 500 during operation.

Figure 6B:
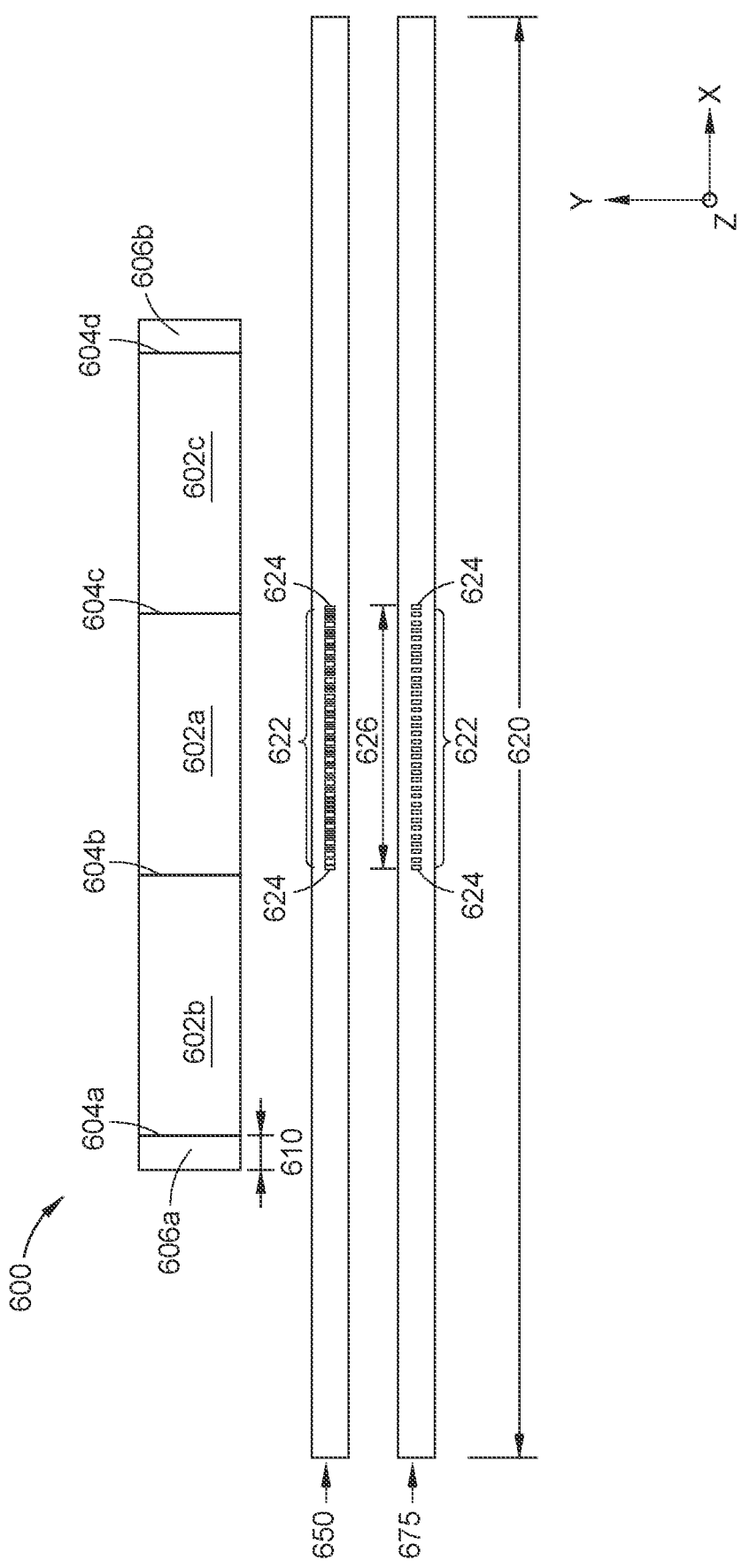
FIG. 6B illustrates various tape head modules configured to write data to and/or read data from the tape of FIG. 6A, according to various embodiments.

FIG. 6A illustrate a tape 600 for use in a tape drive, according to one embodiment. FIG. 6B illustrates various tape head modules 650, 675 configured to write data to and/or read data from the tape 600 of FIG. 6A, according to various embodiments. The tape 600 may be utilized with the tape drive 100 of FIGS. 1A-1C. The tape 600 may be utilized with the tape head module 200 of FIG. 2, for example, the tape 600 may be the tape 204 of FIG. 2. The tape head modules 650, 675 may each individually be a part of the magnetic recording head 126 of FIG. 3. In some embodiments, the tape 600 has a width in the x-direction of about 0.5 inches or about 12,650 µm. The tape 600 comprises three data bands 602a, 602b, 602c and four servo tracks 604a, 604b, 604c, 604d (collectively referred to herein as servo tracks 604). While not shown in FIGS. 6A-6B, each servo track 604a-604d comprises a servo pattern disposed at an angle of about 12 degrees to about 24 degrees, such as about 18 degrees, as discussed further below in FIG. 8.

The first servo track 604a is disposed on a first edge of the tape 600 adjacent to the second data band 602b, the second servo track 604b is disposed between the first data band 602a and the second data band 602b, the third servo track 604c is disposed between the first data band 602a and the third data band 602c, and the fourth servo track 604d is disposed at a second end of the tape 600 adjacent to the third data band 602c. A first overhang portion 606a is disposed adjacent to the first servo track 604a, and a second overhang portion 606b is disposed adjacent to the fourth servo track 604b. The first and second overhang portions 606a, 606b ensure a tape head does not extend past the edge of the tape 600 during operation. The first and second overhang portions 606a, 606b each have a width 610 in the x-direction of about 20 µm to about 25 µm, such as about 22.5 µm.

Each data band 604a-604c has a width 608 in the x-direction between adjacent servo tracks 604 of about one-third the total width of the tape 600, such as about 3800 µm to about 3900 µm, such as about 3858.8 µm. Each data band 602a-602c comprises 65 data channels or data tracks, which can be written to and read from by a tape head of the tape drive. The tape drive may be either a full-high drive configured to write to and/or read from 64 data channels concurrently, or a half-high drive configured to write to and/or read from 32 data channels concurrently.

For example, as shown in FIG. 6B, the tape head module 650 may be utilized in a full-high drive, and the tape head module 675 that may be utilized in a half-high drive. Each tape head module 650, 675 has a length 620 in the x-direction of about 21 mm to about 22 mm, such as about 21.4 mm. Each tape head module 650, 675 comprises a plurality of data elements 622, such as write elements and/or read elements, and two or more sets of servo elements 624. During operation, the plurality of data elements 622 are configured to write data to and/or read data from the data channels or tracks of the tape 600, and the servo elements 624 are configured to read the servo pattern of the servo tracks 604. The tape head module 650 configured to be utilized in a full-high drive comprises 64 wired and operational data elements 622, and the tape head module 675 configured to be utilized in a half-high drive comprises 32 wired and operational data elements 622, as discussed further below in FIGS. 7A-7C.

In each tape head module 650, 675, the width 626 from the first set of servo elements 624 to the second set of servo elements 624 is about 3840 µm to about 3860 µm, such as about 3850 µm. In some embodiments, the width 626 extends from a center between a servo element pair 624 to the center of the other servo element pair 624, like shown in FIG. 7A. In other words, the tape head module 650 capable of writing and reading data to 64 channels has the same width 626 or span as the tape head module 675 capable of writing and reading 32 channels. Thus, the width 626 of the data elements 622 in each tape head module 650, 675 is just less than or nearly equal to the width 608 of a data band 602a-602c of the tape 600, where the width 608 is about 2 µm to about 15 µm, such as about 5 µm to about 10 µm, greater than the width 626.

When the tape 600 is utilized in a full-high drive with a tape head module 650 configured to write to and/or read from 64 data tracks simultaneously, the channel pitch between adjacent data tracks of the 65 data tracks is about 55 µm to about 62 µm, such as about 57.5 µm to about 59 µm. When the tape 600 is utilized in a half-high drive with a tape head module 675 configured to write to and/or read from 32 data tracks simultaneously, the channel pitch between adjacent wired and operational data tracks is about 110 µm to about 120 µm, such as about 116 µm to about 117 µm. The difference in the channel pitch for the full-high and half-high drives is explained further below in FIGS. 7A-7C.

Thus, as compared to the tape 500, the tape 600 comprises one less band 602a-602c, and each band 602a-602c of the tape 600 has a greater width than a band 502a-502d of the tape 500. Furthermore, the width 608 of the each band 604a-604c of the tape 600 is nearly equal to the collective width or span of data elements in a tape head module 650, 675.

Figure 7A:
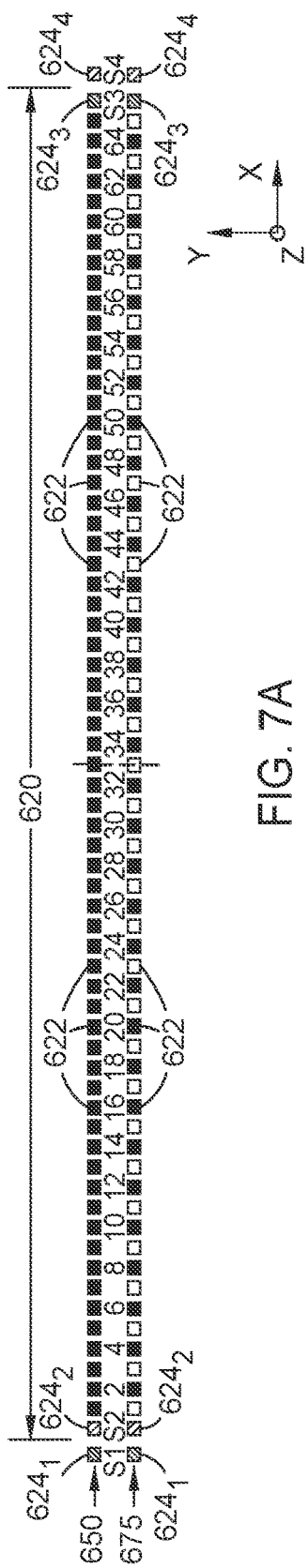
FIGS. 7A-7C illustrate various wiring configurations for a tape head comprising the tape head modules of FIG. 6B, according to various embodiments.
Figure 7B:
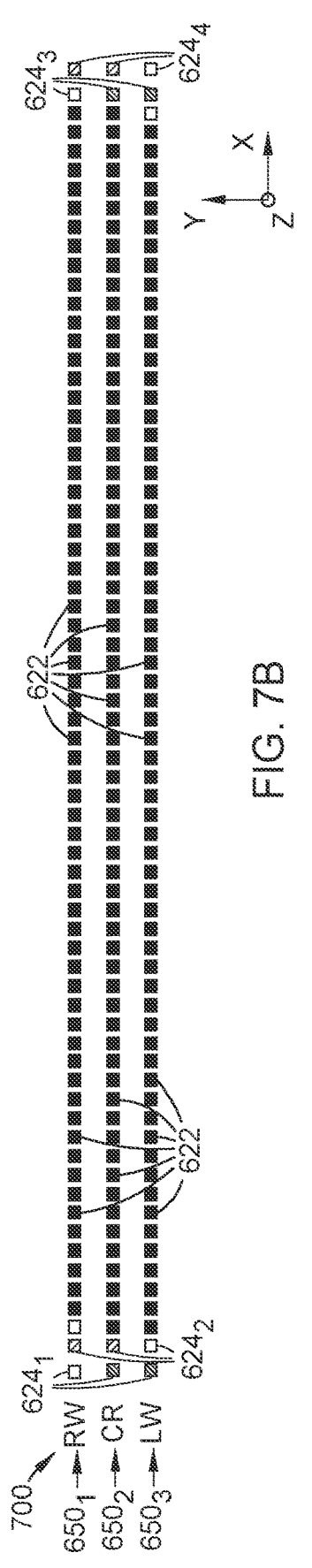
Figure 7C:
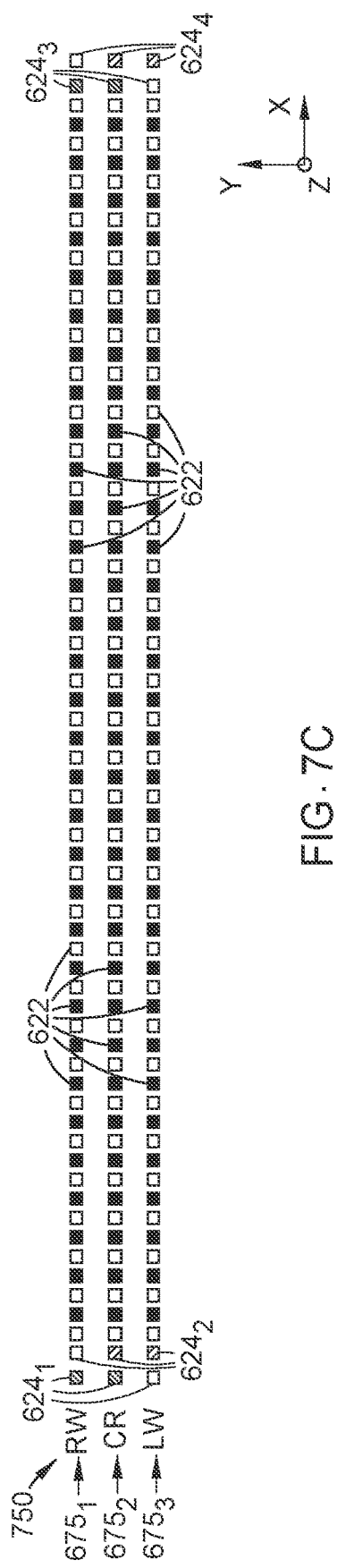

FIGS. 7A-7C illustrate various wiring configurations for the tape head modules 650, 675 of FIG. 6B, according to various embodiments. In these figures, each box represents an element that is fabricated in the wafer process. Each element is electrically wired or not wired (functional/operable or not) depending on overall head module configuration, as shown by the different shadings. Non-wired elements are shown as blank while wired elements are shown as completely filled (data elements) or shaded (servo elements).

FIG. 7A illustrates how the data elements 622 of the tape head module 650 and the tape head module 675 are each wired, according to various embodiments. In the tape head module 650, 64 or 65 data elements 622 and four servo heads $624_1$, $624_2$, $624_3$, $624_4$ are wired and functional for writing and reading data. In some embodiments, only two of the four servo heads $624_1$, $624_2$, $624_3$, $624_4$ may be wired. In the tape head module 675, only the even numbered data elements 622 are wired and functional for writing and reading data, in addition to the four servo heads $624_1$, $624_2$, $624_3$, $624_4$. In other words, every other data element 622 is wired in the tape head module 675, resulting in 32 data elements 622 of the 65 data elements being operable. However, it is noted that the tape head module 675 still comprises all 65 data elements 622; only 32 data elements 622 are capable of being used. In some embodiments, only two of the four servo heads $624_1$, $624_2$, $624_3$, $624_4$ may be wired. By wiring only the even numbered data elements 622 in the tape head module 675, the tape head module 675 is able to be utilized in the smaller half-high drive. As noted above, the width 620 or span of data elements 622 in the tape head module 650 and the tape head module 675 is the same.

FIG. 7B illustrates a tape head 700 configuration comprising three tape head modules $650_1$, $650_2$, $650_3$, each tape head module $650_1$, $650_2$, $650_3$ having 64 or 65 data elements 622 wired. In the first tape head module $650_1$, the data elements 622 are all write elements (right writers (RW)), and 64 data elements 622 and the second and fourth servo elements $624_2$, $624_4$ are wired. The first data element 622 (leftmost of the data elements 622) and the first and third servo elements $624_1$, $624_3$ are not wired. In the second tape head module $650_2$, the data elements 622 are all read elements (center readers (CR)), and 65 data elements 622 and the four servo elements $624_1$-$624_4$ are wired. In the third tape head module $650_3$, the data elements 622 are all write elements (left writers (LW)), and 64 data elements 622 and the first and third servo elements $624_1$, $624_3$ are wired. The 65th data element 622 (rightmost of the data elements 622) and the second and fourth servo elements $624_2$, $624_4$ are not wired. While FIG. 7B shows a W-R-W configuration, variations of a multi-module head may be utilized, as discussed above in FIGS. 3-4B.

When the tape 600 moves over the tape head 700 in a first direction, such as the y-direction, the first tape head module $650_1$ is configured to write data to 64 channels of a band 602 (which may be any band 602a-602c) of the tape 600 using the 64 wired write elements 622 while the second tape head module $650_2$ is configured to read the newly-written data (or any data) stored on 64 or 65 channels of the band 602 using at least 64 of the 65 wired read elements 622. When the tape 600 moves over the tape head 700 in a second direction opposite to the first direction, such as the −y-direction, the third tape head module $650_3$ is configured to write data to 64 channels of a band 602 (which may be any band 602a-602c) of the tape 600 using the 64 wired write elements 622 while the second tape head module $650_2$ is configured to read the newly-written data (or any data) stored on 64 or 65 channels of the band 602 using at least 64 of the 65 wired read elements 622. Thus, the tape head 700 may be utilized in a full-high drive.

FIG. 7C illustrates a tape head 750 configuration comprising three tape head modules 6751, 6752, 6753, each tape head module 6751, 6752, 6753 having the 32 even numbered data elements 622 wired. In the first tape head module 6751, the data elements 622 are all write elements (right writers (RW)), and 32 even numbered data elements 622 and the first and third servo elements $624_1$, $624_3$ are wired. The odd numbered data elements 622 and the second and fourth servo elements $624_2$, $624_4$ are not wired. In the second tape head module 6752, the data elements 622 are all read elements (center readers (CR)), and 32 even numbered data elements 622 and the four servo elements $624_1$-$624_4$ are wired. The odd numbered data elements 622 are not wired. In the third tape head module 6753, the data elements 622 are all write elements (left writers (LW)), and 32 even numbered data elements 622 and the second and fourth servo elements $624_2$, $624_4$ are wired. The odd numbered data elements 622 and the first and third servo elements $624_1$, $624_3$ are not wired. While FIG. 7C shows a W-R-W configuration, variations of a multi-module head may be utilized, as discussed above in FIGS. 3-4B.

When the tape 600 moves over the tape head 750 in a first direction, such as the y-direction, the first tape head module 6751 is configured to write data to 32 channels of a band 602 (which may be any band 602a-602c) of the tape 600 using the 32 wired even numbered write elements 622 while the second tape head module 6752 is configured to read the newly-written data (or any data) stored on 32 channels of the band 602 using the 32 wired read elements 622. When the tape 600 moves over the tape head 750 in a second direction opposite to the first direction, such as the −y-direction, the third tape head module 6753 is configured to write data to 32 channels of a band 602 (which may be any band 602a-602c) of the tape 600 using the 32 wired write elements 622 while the second tape head module 6752 is configured to read the newly-written data (or any data) stored on 32 channels of the band 602 using the 32 wired read elements 622. Thus, the tape head 700 may be utilized in either a full-high drive or a half-high drive.

Figure 8:
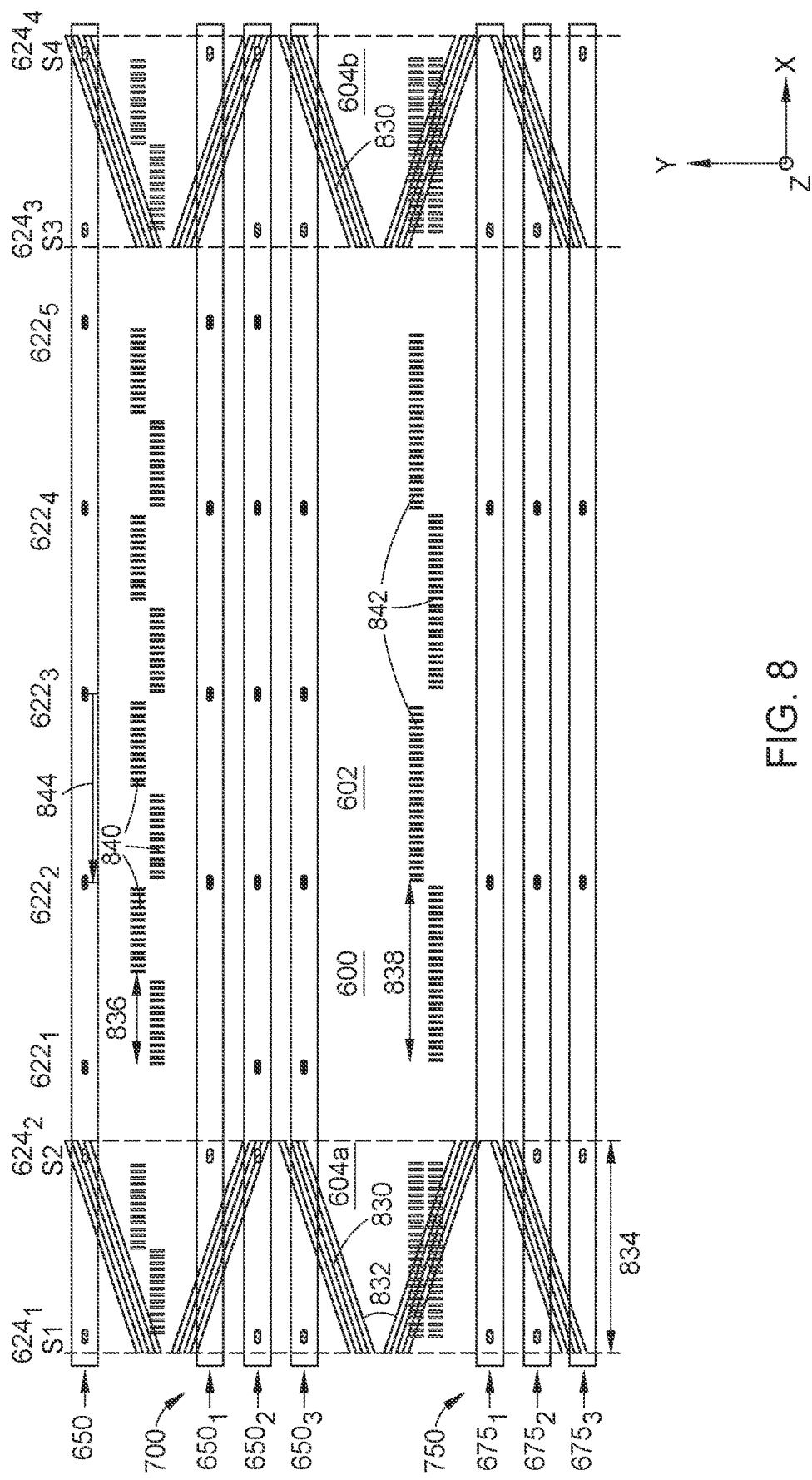
FIG. 8 illustrates the tape head modules of FIGS. 7B-7C disposed over a band of the tape of FIG. 6, according to one embodiment.

FIG. 8 illustrates the tape heads 700, 750 of FIGS. 7B-7C disposed over a band 602 (which may be any band 602a-602c) of the tape 600 of FIG. 6, according to one embodiment. The tape heads 700, 750 are shown disposed over the same tape 600 for explanation purposes. FIG. 8 includes one tape head module 650 to illustrate the various data and servo elements. Moreover, only 5 data elements (6221, 6222, 6223, 6224, 6225) are shown in FIG. 8 for clarity, which is not intended to be limiting.

FIG. 8 further illustrates the servo pattern 830 of the servo tracks 604a-604d of the tape 600. Each servo track 604a-604d is the same, comprising the same servo pattern 830, and FIG. 8 shows only two servo tracks 604a and 604b as examples. The servo pattern 830 comprises a plurality of lines arranged in a chevron pattern. The chevron servo pattern 830 is disposed at an angle 832 of about 12 degrees to about 24 degrees, such as about 18 degrees, which may be steeper than conventional servo patterns, which are generally disposed at an angle of about 12 degrees. The steeper angle 832 allows for more accurate positioning of the tape heads 700, 750 when writing to and reading from the tape 600.

Furthermore, the servo tracks 604a-604d each has a width 834 in the x-direction of about 50 μm to about 70 μm, such as about 58 μm to about 64 μm, which is narrower than conventional servo tracks, which generally have a width of about 93 μm. The width 834 of the servo tracks 604a-604d is nearly the same as the pitch 844 between adjacent data elements 622. The pitch 844 between adjacent data elements 622 is about 40 μm to about 75 μm, such as about 63 μm to about 70 μm. Thus, the pitch between adjacent data elements could range from about 30 μm shorter than the servo track width (40 μm vs. 70 μm) to about 25 μm wider than the servo track width (75 μm vs. 50 μm). In one embodiment, the element pitch between adjacent data elements is about 2 μm to about 10 μm greater than the servo track width. Note that reference numeral 844 is a pitch between all fabricated elements 622, whether actively wired or not. As shown in FIG. 8, the pitch between active elements will differ in the case of module configuration $650_{1-3}$ (full-high) vs. $675_{1-3}$ (half-high), with the pitch in $675_{1-3}$ being about double the width 844.

In the tape head 700, during operation, the first and third tape head modules $650_1$, $650_3$ are configured to write data to channels 840 of the tape 600, and the second tape head module $650_2$ is configured to read data from the channels 840, where each of the channels 840 spans a distance 836 of about 55 μm to about 62 μm, such as about 57.5 μm to about 59 μm. In the tape head 750, during operation, the first and third tape head modules 6751, 6753 are configured to write data to channels 842 of the tape 600, and the second tape head module 6752 is configured to read data from the channels 842, where each of the channels 842 spans a distance 838 of about 110 μm to about 120 μm, such as about 116 μm to about 117 μm.

Therefore, by utilizing a tape comprising three data bands, each data band having a width of about one-third a total width of the tape, with a tape head module having a collective element span or width nearly equal to a width of the bands, in a tape drive, data can be written to and read from the tape quicker and more accurately. Furthermore, the tape comprising three data bands has a servo pattern disposed at an angle of about 18 degrees and a width of the servo tracks of about 58 μm allows for more accurate positioning of the tape head modules of a tape head. Moreover, the tape and tape head modules may be utilized in both full-high and half-high drives without needing to change any components or dimensions.

In one embodiment, a tape comprises three data bands and four servo tracks, a servo track of the four servo tracks being disposed between adjacent data bands of the three data bands, wherein each data band of the three data bands has a width of about one-third a total width of the tape.

The width of each data band of the three data bands is about 3800 µm to about 3900 µm. The total width of the tape is about 0.5 inches. Each of the four servo tracks of the tape comprises a servo pattern, the servo pattern being disposed at an angle of about 12 degrees to about 24 degrees. Each of the four servo tracks have a width of about 40 µm to about 70 µm. A tape drive is configured to receive the tape. The tape drive further comprises one or more tape head modules, each tape head module comprising a plurality of data elements and two or more servo element pairs, the plurality of data elements being write elements or read elements, and a controller configured to control each of the one or more tape head modules to write data to and read data from the tape. An element pitch between adjacent data elements of the plurality of data elements is about 2 µm to about 10 µm greater than the width of the servo tracks.

In another embodiment, a tape drive comprises one or more tape head modules, each tape head module comprising a plurality of data elements and two or more servo element pairs, the plurality of data elements being write elements or read elements, a tape comprising: a first servo track being disposed adjacent to a first edge of the tape, a first data band disposed in contact with the first servo track, a second servo track disposed in contact with the first data band, a second data band disposed in contact with the second servo track, a third servo track disposed in contact with the second data band, a third data band disposed in contact with the third servo track, and a fourth servo track disposed in contact with the third data band, the fourth servo track being disposed at a second edge of the tape opposite the first edge, wherein the first, second, and third data bands each individually has a width of about one-third of a total width of the tape, and a controller configured to control each of the one or more tape head modules to write data to and read data from the tape.

The width of the first, second, and third data bands is about 3800 µm to about 3900 µm. The first, second, third, and fourth servo tracks each comprises a servo pattern, the servo pattern being disposed at an angle of about 12 degrees to about 24 degrees and having a width of about 40 µm to about 70 µm. In at least one of the one or more tape head modules, each data element of the plurality of data elements is wired and operable. Each data element of the plurality of data elements is controllable to write and read a width of the tape spanning a distance of about 55 µm to about 62 µm. In at least one of the one or more tape head modules, at least half the data elements of the plurality of data elements are unwired and inoperable. Each wired and operable data element of the plurality of data elements is controllable to write and read a width of the tape spanning a distance of about 110 µm to about 120 µm.

In yet another embodiment, a tape drive comprises a first tape head module comprising a plurality of write elements and two or more servo element pairs, a second tape head module disposed adjacent to the first tape head module, the second tape head module comprising a plurality of read elements and two or more servo element pairs, a third tape head module disposed adjacent to the second tape head module, the third tape head module comprising a plurality of write elements and two or more servo element pairs, wherein: the tape drive is configured to receive a tape comprising not more than three data bands, each data band having a width of about one-third a total width of the tape, and the first, second, and third head modules is each about 2 µm to about 15 µm narrower than the width of each data band, and a controller configured to control each of the first and third tape head modules to write data to the tape, and to control the second tape head module to read data from the tape.

The first and third tape head modules each individually comprises 64 wired and operable write elements and two or more wired and operable servo element pairs, and wherein the second tape head module comprises 65 wired and operable read elements and two or more wired and operable servo element pairs. Each write element of the pluralities of write elements is controllable to write a width of the tape spanning a distance of about 55 µm to about 62 µm, and wherein each read element of the plurality of read elements is controllable to read a width of the tape spanning a distance of about 55 µm to about 62 µm. The first and third tape head modules each individually comprises at least 64 write elements and two or more servo element pairs, wherein 32 write elements of the at least 64 write elements and the two or more servo element pairs of each of the first and third tape head modules are wired and operable, wherein the second tape head module comprises 65 read elements and two or more servo element pairs, and wherein 32 read elements of the 65 read elements and the two or more servo element pairs of the second tape head module are wired and operable.

The wired 32 write elements of the first and third tape head modules are even numbered write elements, wherein the wired 32 read elements are even numbered read elements, wherein each wired and operable write element of the pluralities of write elements is controllable to write a width of the tape spanning a distance of about 110 µm to about 120 µm, and wherein each wired and operable read element of the plurality of read elements is controllable to read a width of the tape spanning a distance of about 110 µm to about 120 µm. Each of the four servo tracks comprises a servo pattern, the servo pattern being disposed at an angle of about 12 degrees to about 24 degrees and having a width of about 40 µm to about 70 µm.

While the foregoing is directed to embodiments of the present disclosure, other and further embodiments of the disclosure may be devised without departing from the basic scope thereof, and the scope thereof is determined by the claims that follow.

What is claimed is:

1. A tape, comprising:
   three data bands each individually comprising 65 data channels;
   four servo tracks, a servo track of the four servo tracks being disposed between adjacent data bands of the three data bands, wherein each data band of the three data bands has a width of about one-third a total width of the tape;
   a first overhang portion disposed on a first edge of the tape adjacent to a first servo track of the four servo tracks; and
   a second overhang portion disposed on a second edge of the tape opposite the first edge and adjacent to a second servo track of the four servo tracks.

2. The tape of claim 1, wherein the width of each data band of the three data bands is about 3800 µm to about 3900 µm.

3. The tape of claim 2, wherein the total width of the tape is about 0.5 inches.

4. The tape of claim 1, wherein each of the four servo tracks of the tape comprises a servo pattern, the servo pattern being disposed at an angle of about 12 degrees to about 24 degrees.

5. The tape of claim 1, wherein each of the four servo tracks have a width of about 40 µm to about 70 µm.

6. A tape drive configured to receive the tape of claim 1.

7. The tape drive of claim 6, further comprising:
one or more tape head modules, each tape head module comprising a plurality of data elements and two or more servo element pairs, the plurality of data elements being write elements or read elements; and
a controller configured to control each of the one or more tape head modules to write data to and read data from the tape.

8. The tape drive of claim 7, wherein an element pitch between adjacent data elements of the plurality of data elements is about 2 μm to about 10 μm greater than the width of one of the servo tracks.

9. A tape drive, comprising:
one or more tape head modules, each tape head module comprising a plurality of data elements and two or more servo element pairs, the plurality of data elements being write elements or read elements;
a tape comprising:
a first overhang portion disposed on a first edge of the tape;
a first servo track being disposed adjacent to the first overhang portion;
a first data band disposed in contact with the first servo track, the first data band comprising 65 data channels;
a second servo track disposed in contact with the first data band;
a second data band disposed in contact with the second servo track, the second data band comprising 65 data channels;
a third servo track disposed in contact with the second data band;
a third data band disposed in contact with the third servo track, the third data band comprising 65 data channels;
a fourth servo track disposed in contact with the third data band; and
a second overhang portion disposed on a second edge of the tape opposite the first edge and adjacent to the fourth servo track,
wherein the first, second, and third data bands each individually has a width of about one-third of a total width of the tape; and
a controller configured to control each of the one or more tape head modules to write data to and read data from the tape.

10. The tape drive of claim 9, wherein the width of the first, second, and third data bands is about 3800 μm to about 3900 μm.

11. The tape drive of claim 9, wherein the first, second, third, and fourth servo tracks each comprises a servo pattern, the servo pattern being disposed at an angle of about 12 degrees to about 24 degrees and having a width of about 40 μm to about 70 μm.

12. The tape drive of claim 9, wherein, in at least one of the one or more tape head modules, each data element of the plurality of data elements is wired and operable.

13. The tape drive of claim 12, wherein each data element of the plurality of data elements is controllable to write and read a width of the tape spanning a distance of about 55 μm to about 62 μm.

14. The tape drive of claim 9, wherein, in at least one of the one or more tape head modules, at least half the data elements of the plurality of data elements are unwired and inoperable.

15. The tape drive of claim 14, wherein each wired and operable data element of the plurality of data elements is controllable to write and read a width of the tape spanning a distance of about 110 μm to about 120 μm.

16. A tape drive, comprising:
a first tape head module comprising a plurality of write elements and two or more servo element pairs;
a second tape head module disposed adjacent to the first tape head module, the second tape head module comprising a plurality of read elements and two or more servo element pairs;
a third tape head module disposed adjacent to the second tape head module, the third tape head module comprising a plurality of write elements and two or more servo element pairs;
wherein:
the tape drive is configured to receive a tape comprising not more than three data bands, each data band having a width of about one-third a total width of the tape, and
the first, second, and third head modules is each about 2 μm to about 15 μm narrower than the width of each data band, and
a controller configured to control each of the first and third tape head modules to write data to the tape, and to control the second tape head module to read data from the tape.

17. The tape drive of claim 16, wherein the first and third tape head modules each individually comprises 64 wired and operable write elements and two or more wired and operable servo element pairs, and wherein the second tape head module comprises 65 wired and operable read elements and two or more wired and operable servo element pairs.

18. The tape drive of claim 17, wherein each write element of the pluralities of write elements is controllable to write a width of the tape spanning a distance of about 55 μm to about 62 μm, and wherein each read element of the plurality of read elements is controllable to read a width of the tape spanning a distance of about 55 μm to about 62 μm.

19. The tape drive of claim 16, wherein the first and third tape head modules each individually comprises at least 64 write elements and two or more servo element pairs, wherein 32 write elements of the at least 64 write elements and the two or more servo element pairs of each of the first and third tape head modules are wired and operable, wherein the second tape head module comprises 65 read elements and two or more servo element pairs, and wherein 32 read elements of the 65 read elements and the two or more servo element pairs of the second tape head module are wired and operable.

20. The tape drive of claim 19, wherein the wired 32 write elements of the first and third tape head modules are even numbered write elements, wherein the wired 32 read elements are even numbered read elements, wherein each wired and operable write element of the pluralities of write elements is controllable to write a width of the tape spanning a distance of about 110 μm to about 120 μm, and wherein each wired and operable read element of the plurality of read elements is controllable to read a width of the tape spanning a distance of about 110 μm to about 120 μm.

21. The tape drive of claim 16, wherein each of the four servo tracks comprises a servo pattern, the servo pattern being disposed at an angle of about 12 degrees to about 24 degrees and having a width of about 40 μm to about 70 μm.

22. The tape drive of claim 16, wherein the first and third tape head modules each individually comprises 64 wired and operable write elements and two or more wired and operable servo element pairs, and wherein the second tape head module comprises 64 wired and operable read elements and two or more wired and operable servo element pairs.

23. The tape drive of claim 16, wherein the first and third tape head modules each individually comprises at least 64 write elements and two or more servo element pairs, wherein 32 write elements of the at least 64 write elements and the two or more servo element pairs of each of the first and third tape head modules are wired and operable, wherein the second tape head module comprises 64 read elements and two or more servo element pairs, and wherein 32 read elements of the 64 read elements and the two or more servo element pairs of the second tape head module are wired and operable.

* * * * *